US011931813B2

(12) United States Patent
Chen et al.

(10) Patent No.: US 11,931,813 B2
(45) Date of Patent: Mar. 19, 2024

(54) VARIABLE LENGTH TOOL HOLDER

(71) Applicant: Mueller International, LLC, Atlanta, GA (US)

(72) Inventors: Anjian Chen, Champaign, IL (US); Jeffrey Allen Huffman, Monticello, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/900,359

(22) Filed: Aug. 31, 2022

(65) Prior Publication Data

US 2022/0410288 A1 Dec. 29, 2022

Related U.S. Application Data

(62) Division of application No. 16/523,142, filed on Jul. 26, 2019, now Pat. No. 11,458,550.

(51) Int. Cl.
*B23B 51/12* (2006.01)
*B23B 31/11* (2006.01)

(52) U.S. Cl.
CPC ............ *B23B 51/126* (2013.01); *B23B 31/11* (2013.01); *B23B 2231/0204* (2013.01);
(Continued)

(58) Field of Classification Search
CPC .................. B23B 31/11; B23B 51/126; B23B 2231/0204; B23B 2231/04;
(Continued)

(56) References Cited

U.S. PATENT DOCUMENTS 1,028,126 A * 6/1912 Meredith ................ F16G 11/00
279/105.1
1,378,290 A 5/1921 Smith
(Continued)

FOREIGN PATENT DOCUMENTS

WO 2020176023 9/2020

OTHER PUBLICATIONS

Chen, Anjian; Non-Final Office Action for U.S. Appl. No. 16/523,142, filed Jul. 26, 2019, dated Mar. 17, 2022, 11 pgs.
(Continued)

*Primary Examiner* — Eric A. Gates
(74) *Attorney, Agent, or Firm* — Taylor English Duma LLP

(57) ABSTRACT

A tool holder includes a main body defining a mounting end and a receiving end, the mounting end positioned opposite from the receiving end, the main body defining a main body bore extending into the receiving end toward the mounting end; an extension defining a tool head attached to a rod, the tool head defining a tool head end opposite from the rod, a tool holder length defined between the mounting end and the tool head end, the tool head configured to receive at least one cutting tool, the rod received within the main body bore; and a locking mechanism engaging the extension and the main body in a locked position, the locking mechanism being disengaged from either the main body or the extension in an unlocked position, the locking mechanism being selectively positionable about and between the locked position and the unlocked position.

20 Claims, 10 Drawing Sheets

(52) U.S. Cl.
CPC ..... *B23B 2231/04* (2013.01); *B23B 2260/004* (2013.01); *B23B 2260/138* (2013.01); *Y10T 279/17941* (2015.01); *Y10T 279/17991* (2015.01)

(58) Field of Classification Search
CPC ......... B23B 2260/004; B23B 2260/138; Y10T 279/17941; Y10T 279/17991
See application file for complete search history.

(56) References Cited

U.S. PATENT DOCUMENTS

| | | | |
|---|---|---|---|
| 1,647,747 A | | 11/1927 | Prokop |
| 1,801,883 A | * | 4/1931 | Smith .................... B23B 31/028 279/100 |
| 1,867,359 A | * | 7/1932 | Higby ................... B23B 31/028 279/83 |
| 1,975,215 A | * | 10/1934 | Thomas ................ B23B 31/028 403/103 |
| 2,716,030 A | * | 8/1955 | Faso ....................... B23Q 1/703 279/156 |
| 4,332,160 A | * | 6/1982 | Baragar ................. G01N 33/24 73/84 |
| 4,766,783 A | * | 8/1988 | Stanich ................. B25B 21/007 81/177.2 |
| 5,154,104 A | | 10/1992 | O |
| 5,624,214 A | | 4/1997 | Carroll |
| 6,092,612 A | | 7/2000 | Brady |
| 6,171,033 B1 | * | 1/2001 | Wrobel ................. B23B 51/126 408/239 R |
| 7,127,972 B2 | | 10/2006 | Klein et al. |
| 7,802,948 B1 | | 9/2010 | Bastiaans |
| 9,089,901 B2 | * | 7/2015 | White ................. B23B 31/1071 |
| 10,035,197 B2 | | 7/2018 | Boske |
| 11,458,550 B2 | | 10/2022 | Chen et al. |
| 2006/0196321 A1 | * | 9/2006 | Carroll ................ B25B 23/0035 81/177.85 |
| 2021/0023632 A1 | | 1/2021 | Chen et al. |
| 2022/0410289 A1 | | 12/2022 | Chen et al. |

OTHER PUBLICATIONS

Chen, Anjian; Notice of Allowance for U.S. Appl. No. 16/523,142, filed Jul. 26, 2019, dated Jun. 17, 2022, 7 pgs.
Chen, Anjian; Requirement for Restriction/Election for U.S. Appl. No. 16/523,142, filed Jul. 26, 2019, dated Nov. 16, 2021, 8 pgs.
Chen, Anjian; Non-Final Office Action for U.S. Appl. No. 17/900,378, filed Aug. 31, 2022, dated Jul. 12, 2023, 21 pgs.
Chen, Anjian; Requirement for Restriction/Election for U.S. Appl. No. 17/900,378, filed Aug. 31, 2022, dated May 15, 2023, 6 pgs.
Chen, Anjian; Non-Final Office Action for U.S. Appl. No. 17/900,378, filed Aug. 31, 2022, dated Nov. 15, 2023, 13 pgs.

* cited by examiner

VARIABLE LENGTH TOOL HOLDER

CROSS-REFERENCE TO RELATED APPLICATIONS

This application is a divisional of prior application Ser. No. 16/523,142, filed Jul. 26, 2019, which is incorporated in its entirety by reference.

TECHNICAL FIELD

This disclosure relates to tool holders. More specifically, this disclosure relates to a tool holder for a drilling and stopping machine.

BACKGROUND

Fluid systems, such as a municipal water distribution system, commonly carry liquids or gases to customers through a network of pipelines of varying sizes. In order to facilitate new development, new lines and access points can be added to the existing pipeline networks. It is often impractical to isolate, depressurize, and drain the existing lines before tapping the existing pipeline network because doing so may temporarily cutoff service to downstream customers. Instead, drilling and stopping machines are used to drill into the pipelines while the pipelines are still pressurized and filled with fluids.

To add a new line to an existing line, a branched connection can be added to the existing line. The branched connection can be a saddle or similar structure, which can form a seal and attach to the outside of the existing pipeline. The saddles can be clamped on, or in some cases welded, to the outer surface of the existing line. The saddle can define an opening passage and a connection means, such as a threaded portion of pipe or a flange. A valve can then be attached to the connection means, such as by screwing the valve onto the threading of the opening passage or bolting the valve to the flange of the opening passage. A drilling machine can then be attached to the valve to form a sealed cavity between the drilling machine, the valve, and the opening passage.

The drilling machine can be equipped with a boring bar positioned within the sealed cavity. The boring bar can be attached to a tool holder, which in turn can receive cutting tools, such as shell cutters and pilot drills. Once mounted and sealed with the valve, the drilling machine can advance the tool holder and cutting tools through the valve bore when the valve is in the open position. The cutting tools can then penetrate the pipe wall of the existing pipeline so that the opening passage of the saddle can be connected in fluid communication with the bore of the existing pipeline. At this time, fluids can enter the sealed cavity formed between the drilling machine, the valve, and the opening passage of the saddle.

The boring bar can be withdrawn through the valve, thereby retrieving the tool holder and cutting tools from the valve bore. The cutting tools can also retrieve the coupon cut from the existing pipe wall so that it is not left within the existing pipeline. With the boring bar withdrawn, the valve can be actuated to the closed position to seal the opening passage of the saddle. The drilling machine can then be detached from the valve, and the new planned piping connection can be attached to the valve to complete the new line or access point of the fluid system.

Depending on the diameter of the branched connection to be added, the cutting tools can vary in size. Large diameter shell cutters can often be longer than small diameter shell cutters, and the varying length of different shell cutters can require tool holders of different lengths to accommodate these shell cutters. An operator of the drilling machine must ensure that he has the correct tool holder for that diameter shell cutter, and if not, the operator must change out the tool holder, which takes time and effort.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a tool holder comprising a main body defining a mounting end and a receiving end, the mounting end positioned opposite from the receiving end, the main body defining a main body bore extending into the receiving end toward the mounting end; an extension defining a tool head attached to a rod, the tool head defining a tool head end opposite from the rod, a tool holder length defined between the mounting end and the tool head end, the tool head configured to receive at least one cutting tool, the rod received within the main body bore; and a locking mechanism engaging the extension and the main body in a locked position, the locking mechanism being disengaged from either the main body or the extension in an unlocked position, the locking mechanism being selectively positionable about and between the locked position and the unlocked position, the tool holder length being adjustable with the locking mechanism in the unlocked position, the tool holder length being fixed with the locking mechanism in the locked position.

Also disclosed a method for adjusting a tool holder length of a tool holder, the method comprising selectively positioning a locking mechanism in an unlocked position, the locking mechanism engaging either a main body or an extension in the unlocked position; axially repositioning the extension relative to the main body along a body axis to a first length configuration, the main body defining a mounting end and a receiving end, the main body defining a main body bore extending into the receiving end toward the mounting end, the main body bore defining the body axis, the extension defining a tool head attached to a rod, the tool head defining a tool head end opposite from the rod, the tool holder length defined between the mounting end and the tool head end, the rod received within the main body bore; and selectively repositioning the locking mechanism from the unlocked position to the locked position to axially fix the extension to the main body relative to the body axis.

Also disclosed is a tool holder comprising a main body defining a main body bore; an extension defining a tool head attached to a rod, the rod received within the main body bore, the main body and the extension defining a tool holder length; and a locking mechanism engaging the extension and the main body in a locked position, the locking mechanism being disengaged from either the main body or the extension in an unlocked position, the locking mechanism being selectively positionable about and between the locked position and the unlocked position, the tool holder length being adjustable with the locking mechanism in the unlocked position, the tool holder length being fixed with the locking mechanism in the locked position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
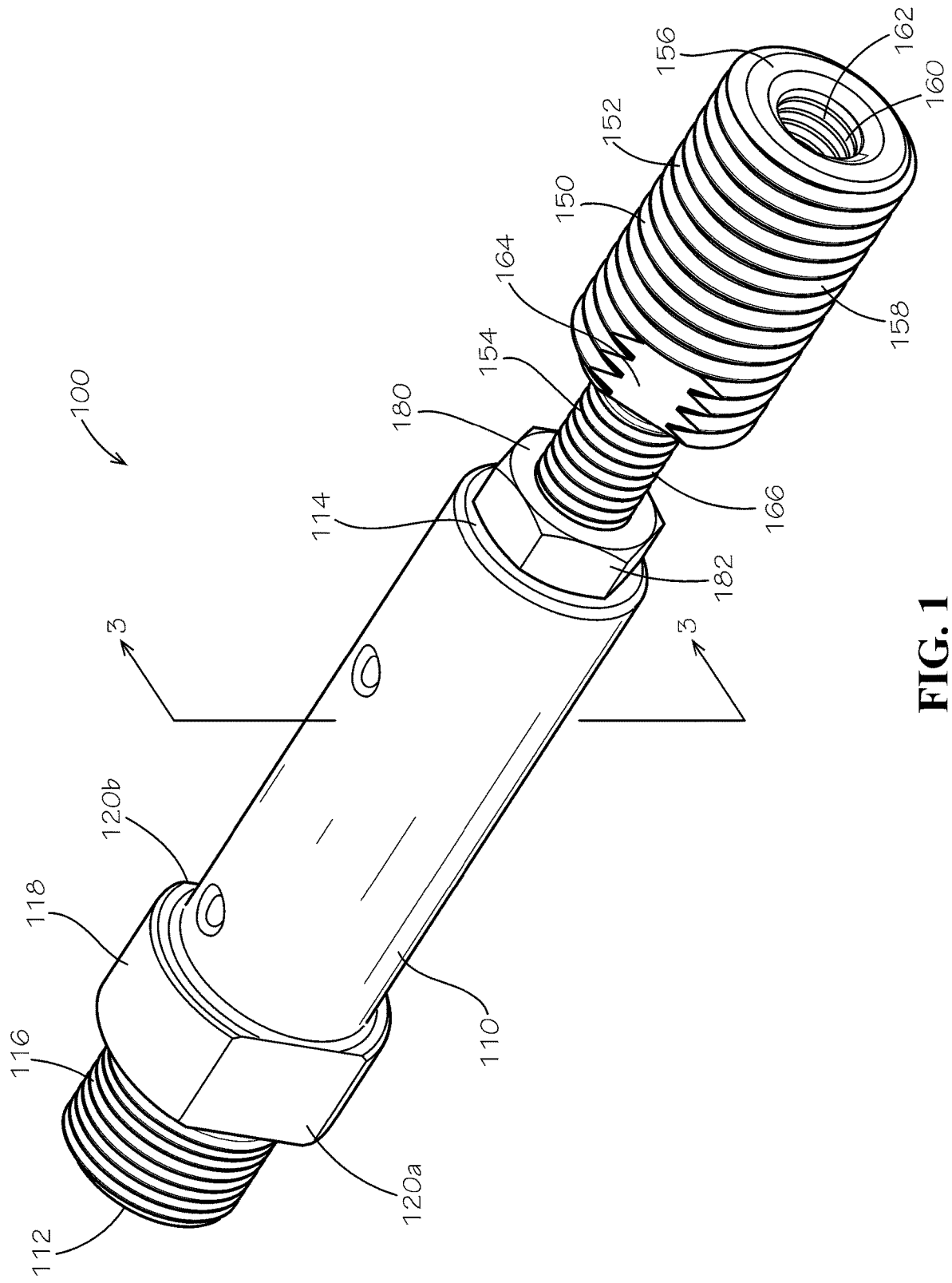
FIG. 1 is a perspective view of a tool holder comprising a main body, an extension, and a locking mechanism in accordance with one aspect of the present disclosure, the tool holder shown in an intermediate length configuration.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a tool holder and associated methods, systems, devices, and various apparatus. The tool holder can comprise a main body, an extension, and a locking mechanism. It would be understood by one of skill in the art that the disclosed tool holder is described in but a few exemplary aspects among many. No particular terminology or description should be considered limiting on the disclosure or the scope of any claims issuing therefrom.

FIG. 1 is a perspective view of a tool holder 100 comprising a main body 110, an extension 150, and a locking mechanism 180 in accordance with one aspect of the present disclosure. The main body 110 can define a mounting end 112 and a receiving end 114. The mounting end 112 can be positioned opposite from the receiving end 114. In the present aspect, the main body 110 can be defined by an elongated rod, and can be substantially cylindrical in shape.

The mounting end 112 can define mounting threading 116. In the present aspect, the mounting threading 116 can be external threading; however, in other aspects, the mounting threading 116 can be internal threading. The mounting threading 116 can be configured to mount the tool holder 100 to the boring bar (not shown) of a drilling machine (not shown). Adjacent to the mounting threading 116, the main body 110 can define a mounting collar 118, which can define an outer diameter greater than that of the mounting threading 116. In the present aspect, the mounting collar 118 can define a pair of parallel flats 120a,b, which can be configured to engage a wrench (not shown). Using the wrench to engage the parallel flats 120a,b, the mounting threading 116 can be threadedly engaged with the boring bar (not shown) and tightened to secure the tool holder 100 to the boring bar. When the mounting threading 116 is threadedly engaged with the boring bar, the mounting threading 116 can engage threading (not shown) defined by the boring bar, which in the present aspect can be external threading.

The extension 150 can define a tool head 152 attached to a rod 154. The tool head 152 can define a tool head end 156 positioned opposite from the rod 154. The tool head 152 can be configured to receive cutting tools (not shown). For example, the tool head 152 can define tool head threading 158, which can be configured to mount a cutting tool such as a primary shell cutter (not shown). In the present aspect, the tool head threading 158 can be external threading. The primary shell cutter can be a cylindrical cutting tool, which can be configured to cut a substantially circular coupon out of a pipe wall (not shown).

The tool head 152 can also define a pilot bore 160. The pilot bore 160 can extend into the tool head end 156 toward the rod 154. In the present aspect, the pilot bore 160 can define internal pilot threading 162; however, in other aspects, the pilot bore 160 may not be threaded. The pilot bore 160 can be configured to receive a cutting tool, such as a pilot drill (not shown) or a pilot shell cutter (not shown), which can be smaller in diameter than the primary shell cutter. The pilot drill or pilot shell cutter can be configured to cut into a pipe wall to hold a centered position while the primary shell cutter cuts a larger hole in the pipe wall. The pilot drill or pilot shell cutter can prevent the primary shell cutter from "walking," or sliding across, on the outer surface of the pipe wall during cutting.

The tool head 152 can also define a pair of parallel flats 164 (only one parallel flat 164 is shown), which are configured to engage a wrench (not shown). As is described in greater detail below with respect to FIG. 2, the rod 154 can threadedly engage the main body 110, and the pair of parallel flats 164 can be engaged with the wrench to rotate the extension 150 relative to the main body 110. Depending on the direction of rotation, the extension 150 can be screwed inwards toward the main body 110 to reduce a tool holder length L (shown in FIG. 2) of the tool holder 100 or outwards and away from the main body 110 to increase the tool holder length L.

Returning to FIG. 1, in the present aspect, the locking mechanism 180 can comprise a jam nut 182. The rod 154 can define rod threading 166, and the jam nut 182 can define nut threading 282 (shown in FIG. 2). In the present aspect, the rod threading 166 can be external threading, and the nut threading 282 can be internal threading. The nut threading 282 of the jam nut 182 can threadedly engage the rod threading 166 of the rod 154. In the present aspect, the locking mechanism 180 is shown in a locked position. In the locked position, the locking mechanism 180, in this case the jam nut 182, engages both the main body 110 and the extension 150. The jam nut 182 can engage the main body 110 by being tightened against the receiving end 114 of the main body 110. When the jam nut 182 is tightened against the receiving end 114 in the locked position, the extension 150 can be rotationally fixed to the main body 110.

Because the extension 150 can threadedly engage the main body 110, by rotationally fixing the extension 150 to the main body 110, the tool holder length L of the tool holder 100 can be fixed while the locking mechanism 180 is in the locked position. The tool holder length L cannot be changed without selectively repositioning the locking mechanism 180, i.e., the jam nut 182, to an unlocked position (not shown) in which there is a gap between the jam nut 182 and the receiving end 114. In the unlocked position, the jam nut 182 only engages the rod 154 but not the main body 110. With a gap between the jam nut 182 and the receiving end 114, the extension 150 can be freely rotated relative to the main body 110 to increase or decrease the tool holder length L. In FIG. 1, the tool holder 100 can be in an intermediate length configuration of the tool holder length L, which is described below in greater detail with respect to FIG. 2.

Figure 2:
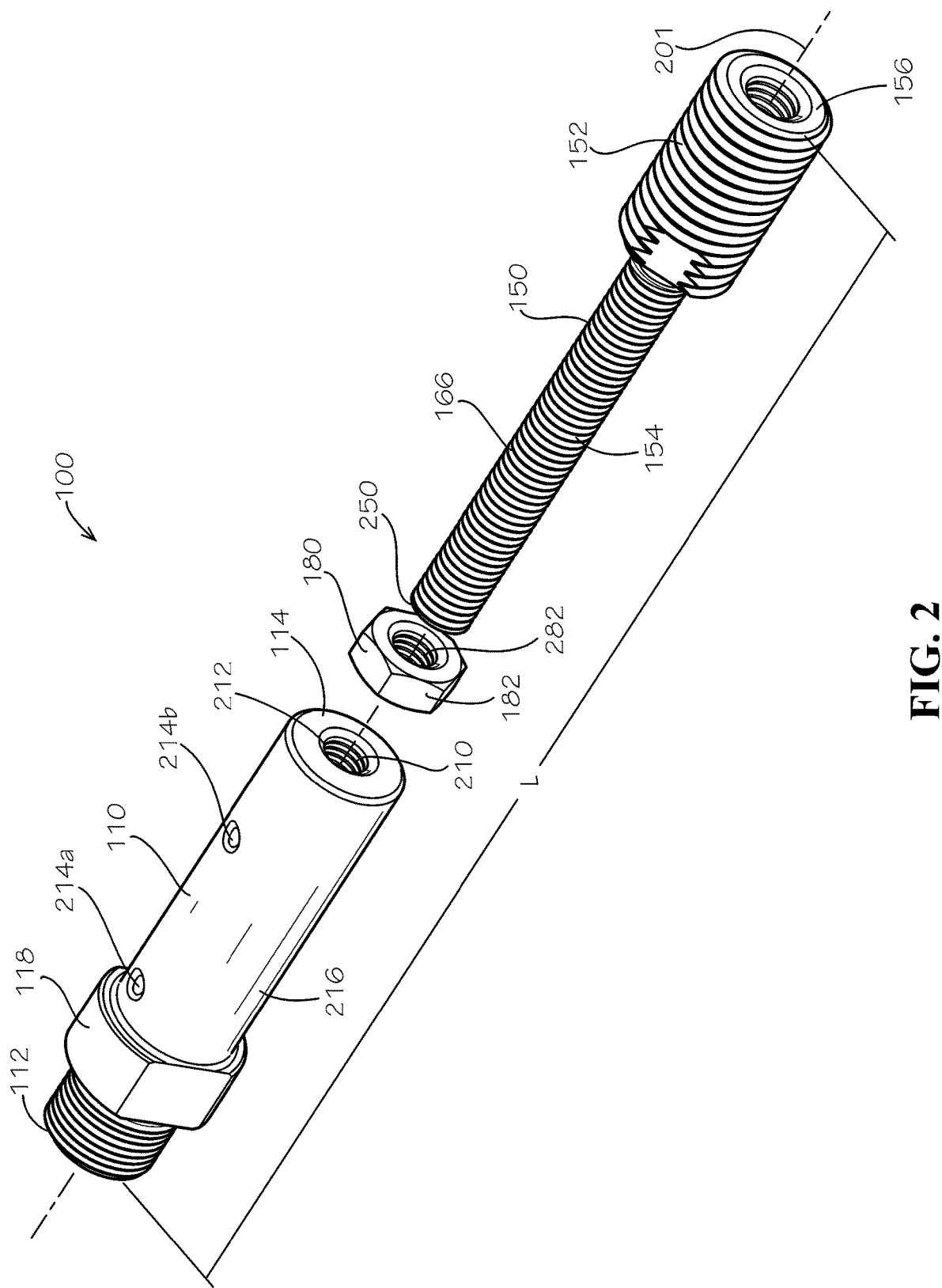
FIG. 2 is an exploded perspective view of the tool holder of FIG. 1.

FIG. 2 is an exploded view of the tool holder 100 of FIG. 1. The main body 110 can define a main body bore 210. The main body bore 210 can extend into the receiving end 114 of the main body 110 toward the mounting end 112. The main body bore 210 can define body threading 212. In the present aspect, the body threading 212 can be internal threading. The main body bore 210 can define a body axis 201. The tool holder length L can be defined along the body axis 201 between the tool head end 156 of the extension 150 and the mounting end 112 of the main body 110. Due to the threaded engagement of the rod 154 with the main body bore 210, rotation of the extension 150 relative to the main body 110 can result in translation of the extension 150 along the body axis 201 relative to the main body 110.

The main body 110 can define an outer surface 216, which in the present aspect can be substantially cylindrical. The main body 110 can define a plurality of witness holes 214a,b,c,d (witness holes 214c,d shown in FIG. 3), which can extend from the outer surface 216 to the main body bore 210. The rod 154 of the extension 150 can define a rod end 250 opposite from the tool head 152. To assemble the tool holder 100, the rod threading 166 of the rod 154 can be threadedly engaged first with the nut threading 282 of the jam nut 182 and then with the body threading 212 of the main body bore 210.

The witness holes 214a,b,c,d can be configured to repeatably achieve different length configurations for the tool holder length L. As described above, the tool holder 100 is shown in the intermediate length configuration for the tool holder length L in FIG. 1. To achieve the intermediate length configuration, the extension 150 can be screwed into the main body 110 until the rod end 250 can be viewed through witness hole 214a or witness hole 214c (shown in FIG. 3). With the rod end 250 visible through witness hole 214a,c, the locking mechanism 180, i.e. jam nut 182, can then be placed in the locked position by tightening the jam nut 182 against the receiving end 114 to secure the tool holder length L in the intermediate length configuration. To extend the tool holder 100 to a long length configuration (as shown in FIG. 4) of the tool holder length L, the jam nut 182 can be loosened to the unlocked position wherein the jam nut 182 does not contact the receiving end 114. The extension 150 can then be rotated relative to the main body 110 until the rod end 250 can be viewed through witness hole 214b or witness hole 214d (shown in FIG. 3). With the rod end 250 visible through one of the second witness holes 214b,d, the jam nut 182 can be repositioned to the locked position by tightening the jam nut 182 against the receiving end 114 to secure the tool holder 100 in the long length configuration of the tool holder length L.

Another possible technique for setting the tool holder length L is to insert a tool (not shown) through one of the witness holes 214a,b,c,d or an opposing pair of witness holes 214a,c or 214b,d and then screw the extension 150 into the main body 110 until the rod end 250 contacts the tool. For example, a nail, pin, bolt, screw, screwdriver, Allen wrench, or similar tool could be inserted through the witness hole 214a,b,c,d until contacted by the rod end 250. By doing so, the extension 150 can be prevented from screwing further into the main body 110 when the jam nut 182 is tightened in the locked position. In such instances, the tool can provide a positive stop for the rod end 250.

Figure 3:
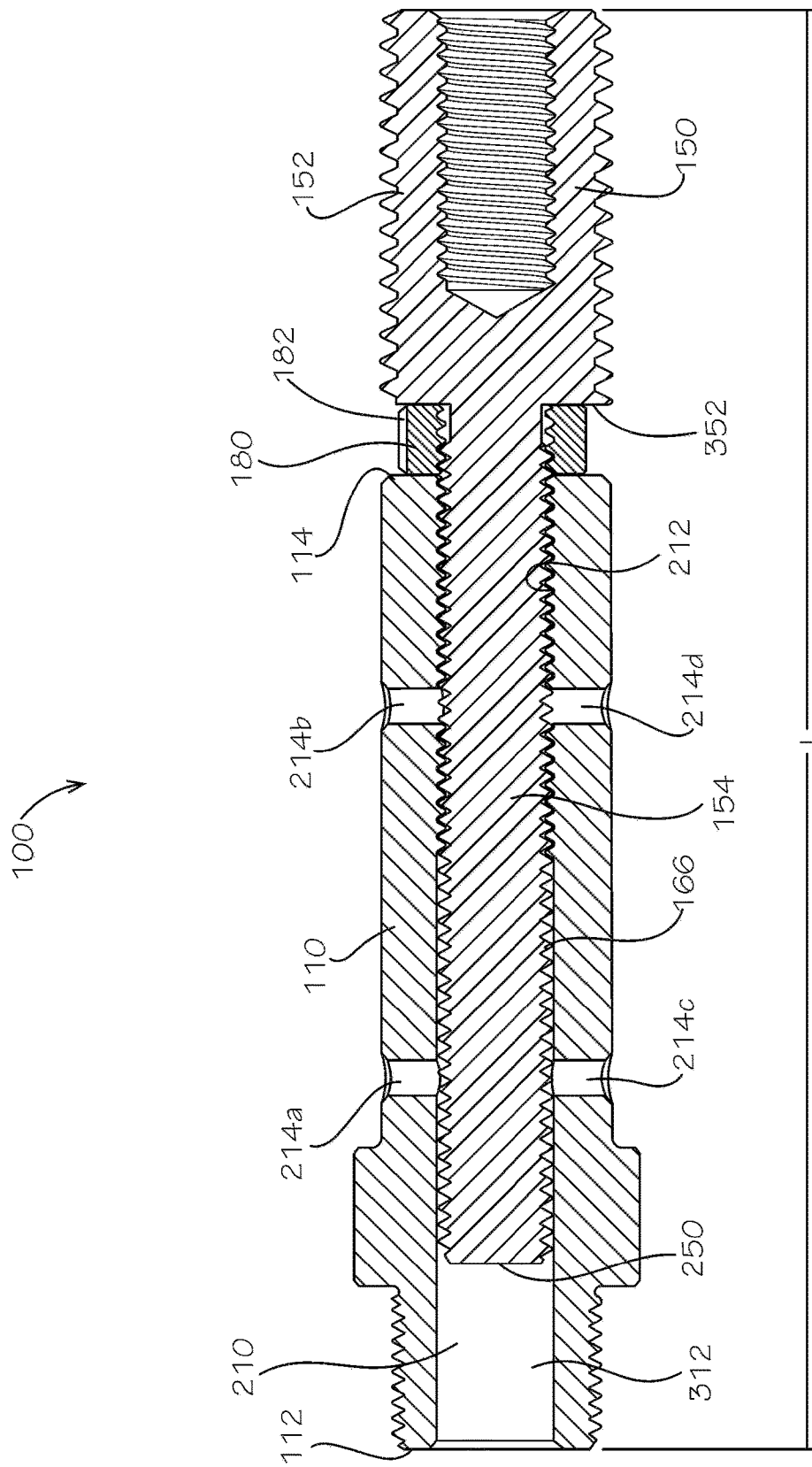
FIG. 3 is a cross-sectional view of the tool holder of FIG. 1 taken along line 3-3 shown in FIG. 1 in a short length configuration.
Figure 4:
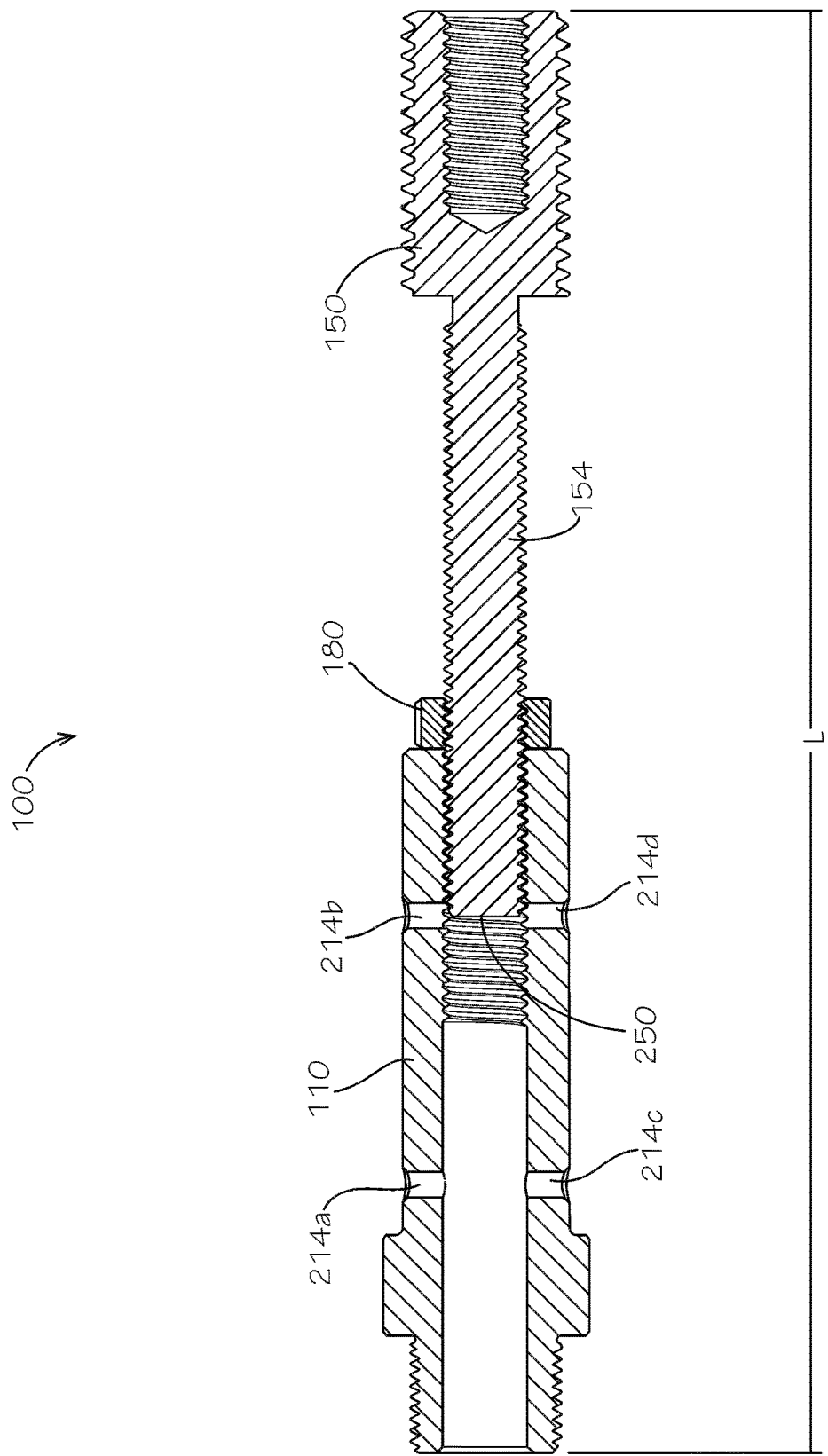
FIG. 4 is a cross-sectional view of the tool holder of FIG. 1 taken along line 3-3 shown in FIG. 1 in a long length configuration.

FIG. 3 is a cross-sectional view of the tool holder 100 of FIG. 1 taken along line 3-3 shown in FIG. 1, with the tool holder 100 shown in a short length configuration of the tool holder length L. In the short length configuration, the locking mechanism 180, jam nut 182, can engage both the receiving end 114 of the main body 110 and the tool head 152 of the extension 150. The tool head 152 can define a tool head shoulder 352, which steps down from the tool head 152 to the rod 154. In the short length configuration, the tool head shoulder 352 can be tightened against the jam nut 182. The short length configuration can be the shortest possible value for the tool holder length L in this aspect. As shown, the rod end 250 may not align with any of the witness holes 214a,b,c,d in the short length configuration of the tool holder length L.

In the present aspect, the main body bore 210 can extend from the mounting end 112 to the receiving end 114 of the main body 110. In other aspects, the main body bore 210 may not extend through the mounting end 112. In the present aspect, the body threading 212 does not extend all of the length of the main body bore 210 from the receiving end 114 to the mounting end 112. Instead, a counter-bored portion 312 of the main body bore 210 can be defined between the mounting end 112 and the body threading 212. The counter-bored portion 312 can define a diameter large enough to not threadedly engage the rod threading 166 of the rod 154. In other aspects, the body threading 212 may extend the full length of the main body bore 210.

The intermediate length configuration, the long length configuration, and the short length configuration of the tool holder length L can each correspond to different size cutting tools (not shown). Any of the above-mentioned length configurations can be a first length configuration or a second length configuration. As previously discussed, the tool head 152 can be configured to receive shell cutters of different sizes. In the present aspect, the tool holder 100 can be compatible with 4", 6", and 8" diameter shell cutters, for example and without limitation. In other aspects, the tool holder 100 can be compatible with different sizes of shell cutters or a greater or smaller range of shell cutter diameters.

For the same drilling and stopping equipment setup (same machine adapter, gate valve, sleeve, etc.), commonly available shell cutters generally increase in length as the diameter of the shell cutter increases in size. For example, an 8" diameter shell cutter generally is longer than a 6" diameter shell cutter, which is longer than a 4" diameter shell cutter. The different short, intermediate, and long length configurations of the tool holder length L can correspond to shell cutters of different lengths. As shown in FIG. 3, the short length configuration for the tool holder length L can be the shortest length configuration of the tool holder length L. For this particular aspect of the tool holder and given the same drilling and stopping equipment setup, the short length configuration can correspond to the 8" diameter shell cutter, which is the largest and longest shell cutter for which this aspect of the tool holder is designed. The intermediate length configuration of the tool holder length L, shown in FIG. 1, can correspond to the 6" diameter shell cutter. The long length configuration of the tool holder length L, shown in FIG. 4, which is the longest length configuration of the tool holder length L for this aspect, can correspond to the 4" diameter shell cutter, which is the smallest and shortest shell cutter size for this particular aspect of the tool holder 100. Changing components of the drilling and stopping equipment setup can affect these relationships. For example, if going to a larger shell cutter size requires using a larger gate valve in the drilling and stopping equipment setup, the larger shell cutter may require a longer tool holder length because the cutting travel distance may increase due to the longer bore length of the larger valve size.

FIG. 4 is a cross-sectional view of the tool holder 100 of FIG. 1 taken along line 3-3 shown in FIG. 1. In the aspect shown, the tool holder 100 is configured at the long length configuration of the tool holder length L, which is the longest overall length for this particular aspect of the tool holder 100. In this configuration, the rod end 250 of the rod 154 can be aligned with the witness holes 214b,d, and the locking mechanism 180 can then be placed in the locked position, as shown. As shown, the witness holes 214a,c and 214b,d can be aligned as pairs on opposite sides of the main body 110. In other aspects, the main body 110 can define greater or fewer pairs of witness holes 214a,b,c,d, which can correspond to greater or fewer length configurations of the tool holder length L than shown. In aspects with a greater number of witness holes 214, the tool holder 100 can define multiple intermediate length configurations (between the short length configuration and the long length configuration) of varying lengths of the tool holder length L. In other aspects, the witness holes 214a,b,c,d, may not be arranged as aligned pairs, but may instead be staggered on opposite sides or circumferentially about the main body 110.

Figure 5:
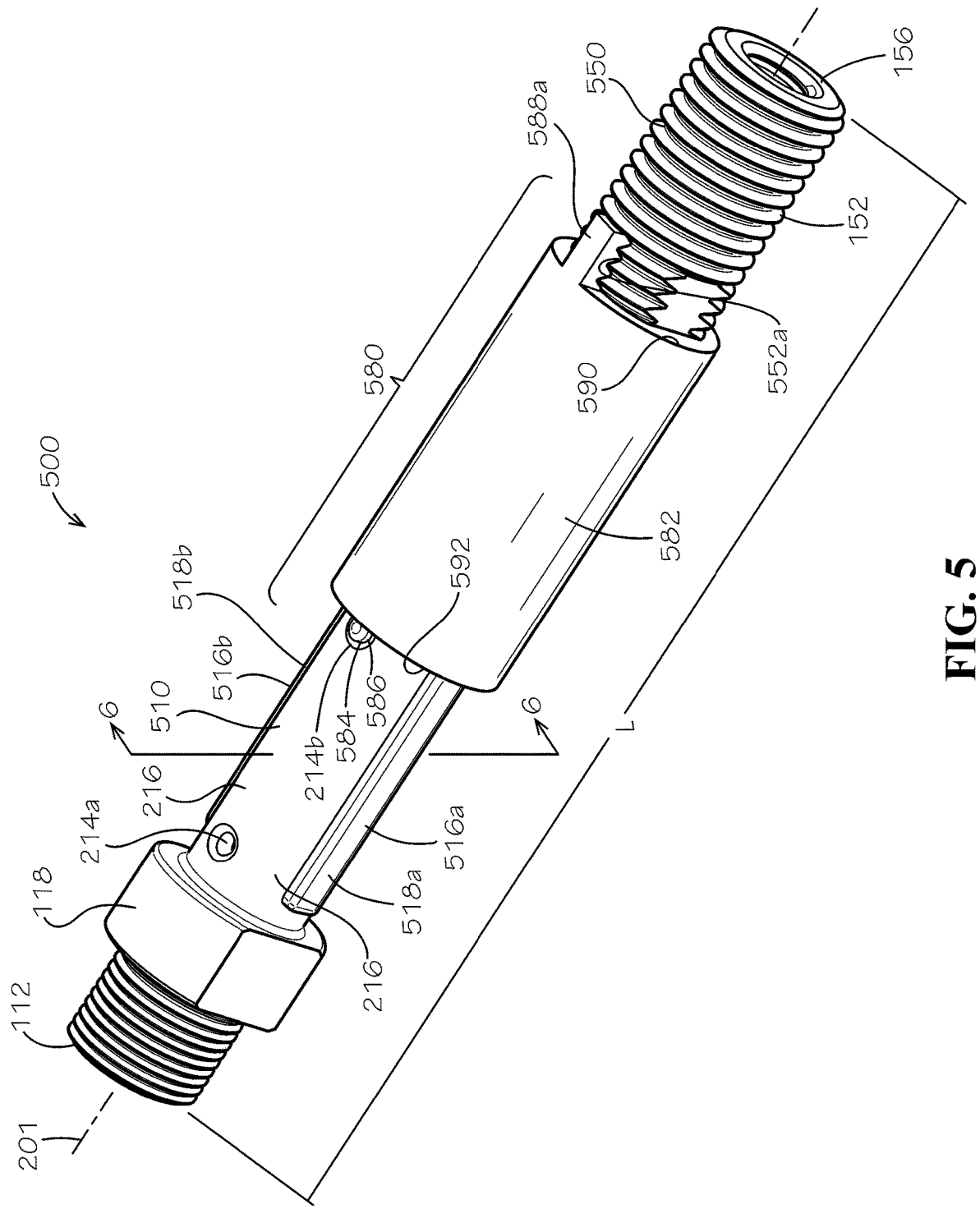
FIG. 5 is a perspective view of another aspect of the tool holder comprising another aspect of each of the main body, the extension, and the locking mechanism in accordance with another aspect of the present disclosure.

FIG. 5 is a perspective view of another aspect of the tool holder 500 in accordance with another aspect of the present disclosure. The tool holder 500 can comprise another aspect of the main body 510, another aspect of the extension 550, and another aspect of the locking mechanism 580, each in accordance with another aspect of the present disclosure. In the present aspect, the main body 510 can be substantially similar to the main body 110 of FIG. 1; however, the outer surface 216 of the main body 510 can define guide structures 516a,b. In the present aspect, the guide structures 516a,b can be a pair of raised guide rails 518a,b. In other aspects, the guide structures 516a,b can be a different type of structure, such as grooves cut into the main body 510, for example and without limitation. The guide structures 516a,b can extend along the main body 510 at least partially between the mounting end 112 and the receiving end 114 (shown in FIG. 6). The guide structures 516a,b can be oriented substantially parallel to the body axis 201.

Figure 7:
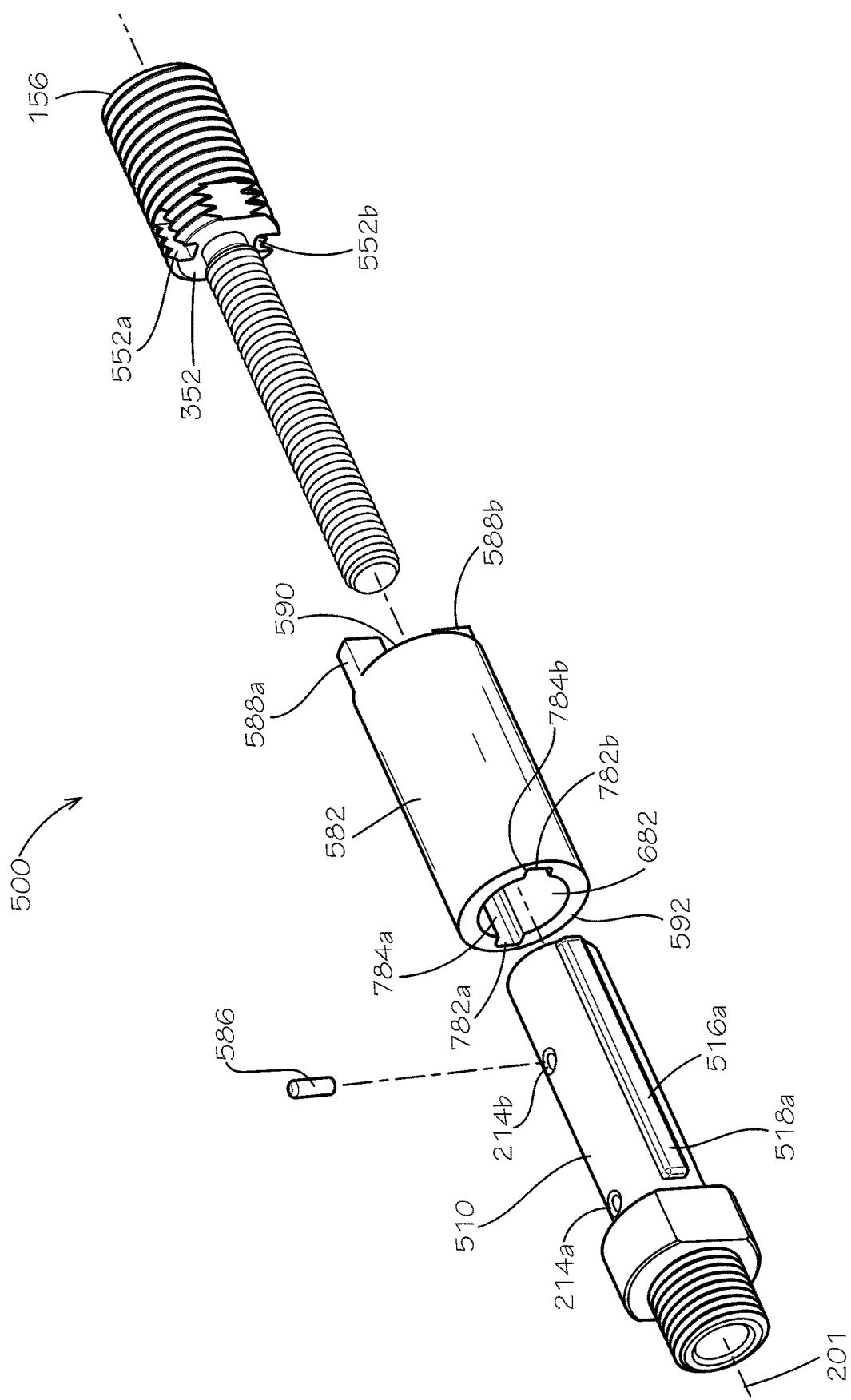
FIG. 7 is an exploded perspective view of the tool holder of FIG. 5.

In the present aspect, the extension 550 can be substantially similar to the extension 150 of FIG. 1; however, the extension 550 can define a pair of locking notches 552a,b (locking notch 552b shown in FIG. 7). The locking notches 552a,b can extend into the tool head shoulder 352 (shown in FIG. 7) toward the tool head end 156.

The locking mechanism 580 can comprise a locking sleeve 582 and a sleeve retention device 584. The locking sleeve 582 can fit over the main body 510, and the locking sleeve 582 can ride along the guide structures 516a,b, such as the guide rails 518a,b. The locking sleeve 582 can define a locking end 590 facing the tool head 152 and a body end 592 facing the mounting collar 118. The body end 592 can be disposed opposite from the locking end 590. The guide structures 516a,b can rotationally fix the locking sleeve 582 to the main body 510 about the body axis 201; however, the locking sleeve 582 can be axially movable along the body axis 201 relative to the main body 510 when the sleeve retention device 584 is not active or in place.

The locking mechanism 580 is shown in the locked position in the present aspect. The locking sleeve 582 can define a pair of locking lugs 588a,b (locking lug 588b shown in FIG. 7) extending outwards from the locking end 590. In the locked position, the locking sleeve 582 can axially slide towards the tool head 152 so that the locking lugs 588a,b can engage the locking notches 552a,b. As previously discussed, the locking sleeve 582 can be rotationally fixed relative to the main body 510, and engagement between the locking lugs 588a,b and the locking notches 552a,b can rotationally fix the locking sleeve 582 to the extension 550 about the body axis 201. Therefore, in the locked position, the main body 510, the locking sleeve 582, and the extension 550 can all be rotationally fixed relative to one another about the body axis 201. Because the extension 550 can threadedly engage the main body 510, rotationally fixing the extension 550 to the main body 510 can also axially fix the extension 550 to the main body 510 along the body axis 201, thereby setting or fixing in place the tool holder length L while the locking sleeve 582 is in the locked position.

The locking mechanism 580 can be placed in the unlocked position by axially sliding the locking sleeve 582 towards the mounting end 112 of the main body 510 until the locking lugs 588a,b disengage from the locking notches 552a,b. In the unlocked position, the locking sleeve 582 may only engage the main body 510. The sleeve retention device 584 can resist axial motion of the locking sleeve 582 along the body axis 201, such as movement about and between the locked and unlocked positions. In the present aspect, the sleeve retention device 584 can be a plug 586 which can be inserted into a one of the witness holes 214a,b,c,d (witness holes 214c,d shown in FIG. 6) to prevent the sleeve retention device 584 from sliding towards the mounting end 112 of the main body 510 through interference with the body end 592 of the locking sleeve 582. In some aspects, the witness holes 214a,b,c,d can be threaded, and the plug 586 can threadedly engage the witness holes 214a,b,c,d. In such aspects, the plug 586 can be a bolt, screw, or other similar fastener. In other aspects, the plug 586 can frictionally engage the witness holes 214a,b,c,d such as if the plug 586 comprises a resilient material such as a rubber plug or a roll pin.

In other aspects, the witness holes 214a,b,c,d could be fit with a different type of sleeve retention device 584, such as a captured spring detent mechanism comprising a ball or plunger configured to engage the body end 592 of the locking sleeve 582. In some aspects, the sleeve retention device 584 can be mounted on the locking sleeve 582. For example, the sleeve retention device 584 could be a spring detent which can engage the witness holes 214a,b,c,d or other similar depressions. In other aspects, the sleeve retention device 584 can be a biasing element, such as a coil spring, which can be positioned around the main body 510 between the mounting collar 118 and the body end 592 of the locking sleeve 582. The biasing element can bias the locking sleeve 582 towards engagement with the tool head 152, and the biasing element can be overcome by gripping the locking sleeve 582 and pulling it towards the mounting collar 118.

Figure 6:
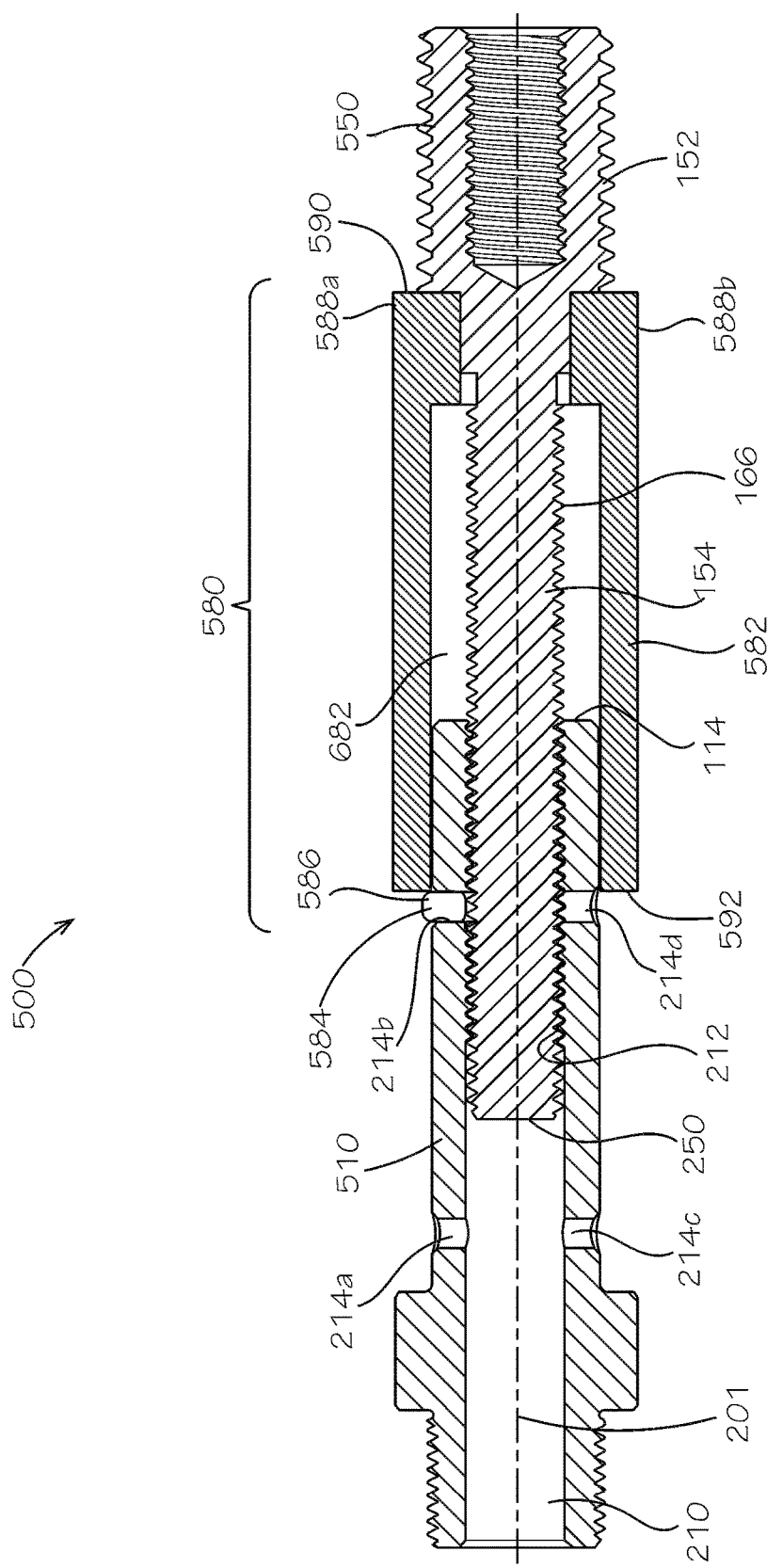
FIG. 6 is a cross-sectional view of the tool holder of FIG. 5 taken along line 6-6 shown in FIG. 5.

FIG. 6 is a cross-sectional view of the tool holder 500 of FIG. 5 taken along line 6-6 shown in FIG. 5. The tool holder 500 is shown with the locking mechanism 580 in the locked position. In this position, the locking lugs 588a,b can engage the locking notches 552a,b (shown in FIG. 7) of the tool head 152, and the body end 592 can be positioned against the sleeve retention device 584, i.e. the plug 586. The locking sleeve 582 can define a sleeve bore 682 extending through the locking sleeve 582 from the body end 592 to the locking end 590. The sleeve bore 682 can be coaxial to the body axis 201, and the sleeve bore 682 can receive the main body 510 through the body end 592. In the locked position, the rod 154 can be fully enclosed within the main body bore 210 and the sleeve bore 682, which can be desirable to protect the rod threading 166 from damage, such as through mechanical impact.

In this aspect of the tool holder 500, the length configurations for the tool holder length L (shown in FIG. 5) may not be determined by aligning the rod end 250 with the witness holes 214a,b,c,d. Instead, the length configurations may be determined based on the positioning of the sleeve retention device 584 and the body end 592 of the locking sleeve 582 while achieving full engagement between the locking lugs 588a,b and the locking notches 552a,b (shown in FIG. 7). This process is described below in greater detail with respect to FIGS. 8-10. In other aspects, the rod end 250 can align with the witness holes 214a,b,c,d for each length configuration of the tool holder length L. In such aspects, the sleeve retention device 584 may extend through opposing pairs of witness holes 214a,c, 214b,d.

FIG. 7 is an exploded view of the tool holder 500 of FIG. 5. As shown, the locking notches 552a,b can extend into the tool head shoulder 352 and towards the tool head end 156. The locking notches 552a,b can extend into the tool head shoulder 352 substantially parallel to the body axis 201. The locking lugs 588a,b can extend outward from the locking end 590 of the locking sleeve 582 and away from the body end 592. The locking lugs 588a,b can extend axially outward from the locking end 590 substantially parallel to the body axis 201.

The locking sleeve 582 can define a pair of guide structures 782a,b, which can be complimentary to the guide structures 516a,b of the main body 510. In the present aspect, the guide structures 516a,b (guide structure 516b shown in FIG. 5) of the main body 510 can be guide rails 518a,b, (guide rail 518b shown in FIG. 5) and the guide structures 782a,b of the locking sleeve 582 can be guide grooves 784a,b shaped complimentary to the guide rails 518a,b. In other aspect, the guide structures 782a,b of the locking sleeve 582 can be rails or other protuberances, and the guide structures 516a,b of the main body 510 can be grooves shaped to receive the guide structures 782a,b. When the main body 510 is inserted into the sleeve bore 682 of the locking sleeve 582, the guide rails 518a,b can be received within the guide grooves 784a,b, and the locking sleeve 582 can be rotationally fixed to the main body 510 about the body axis 201. The guide grooves 784a,b can ride on the guide rails 518a,b as the locking sleeve 582 translates along the body axis 201 relative to the main body 510.

Figure 8:
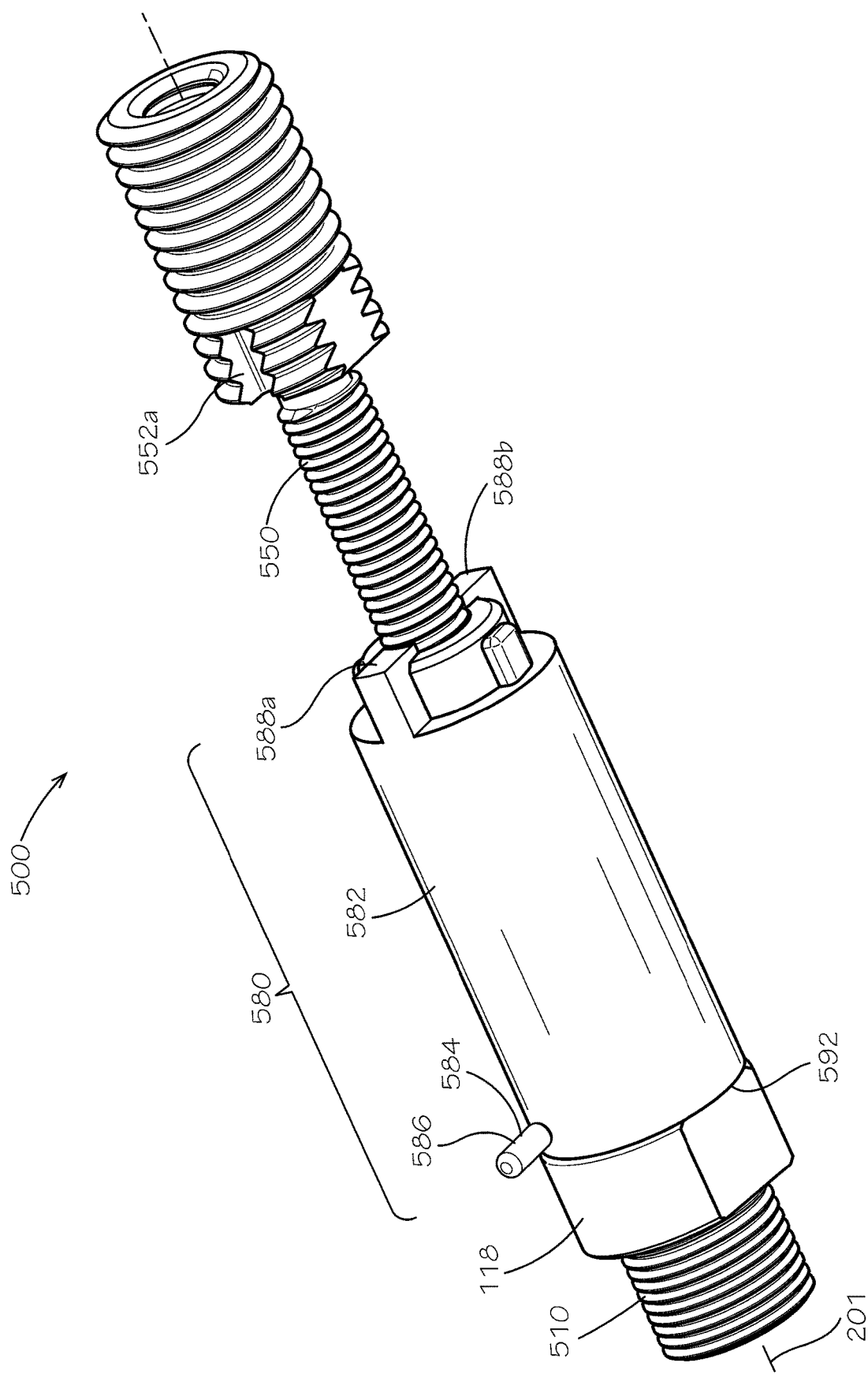
FIG. 8 is a perspective view of the tool holder of FIG. 5 demonstrating a first step in setting a tool holder length of the tool holder.
Figure 9:
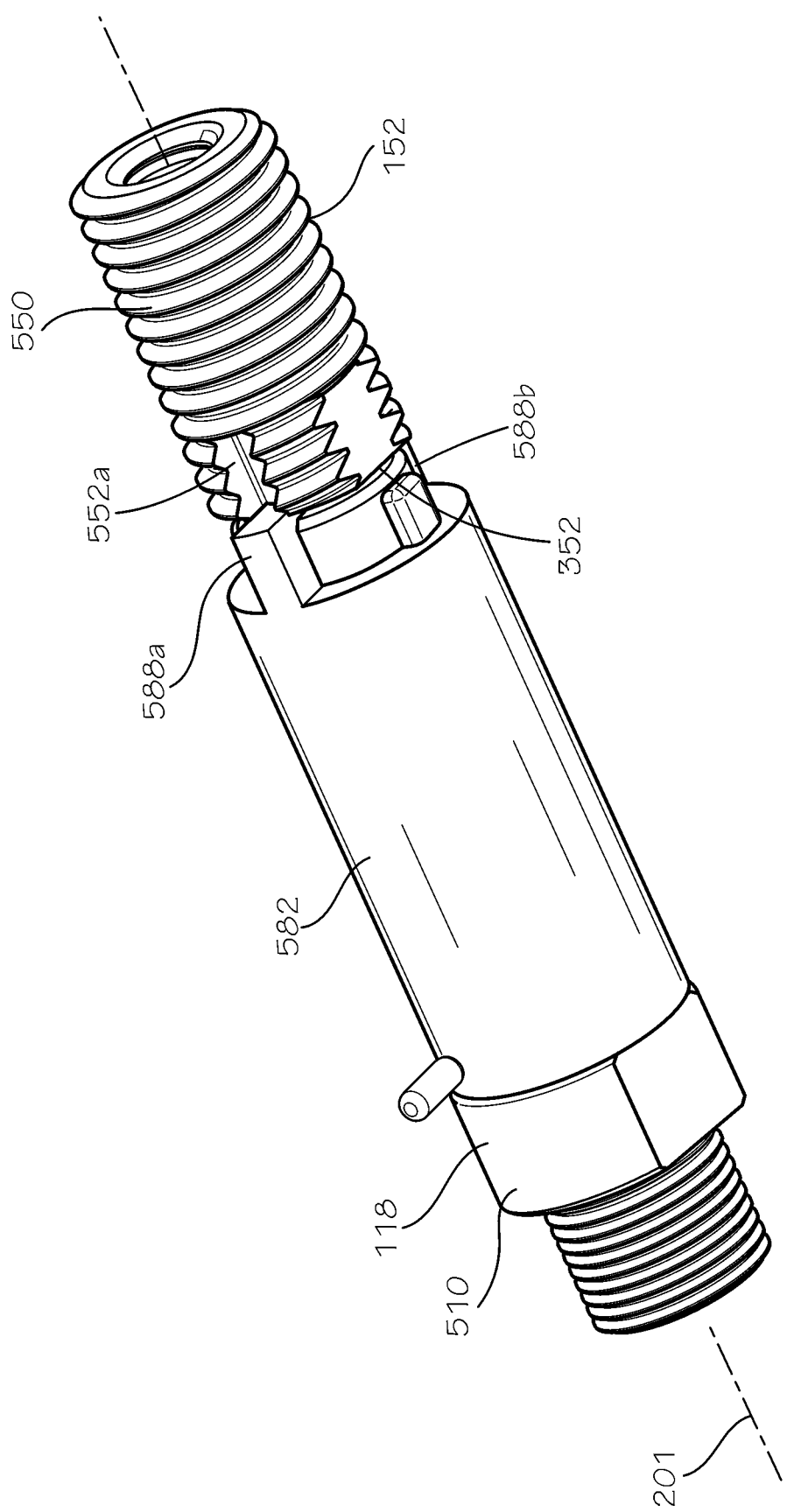
FIG. 9 is a perspective view of the tool holder of FIG. 5 demonstrating a second step in setting the tool holder length of the tool holder.
Figure 10:
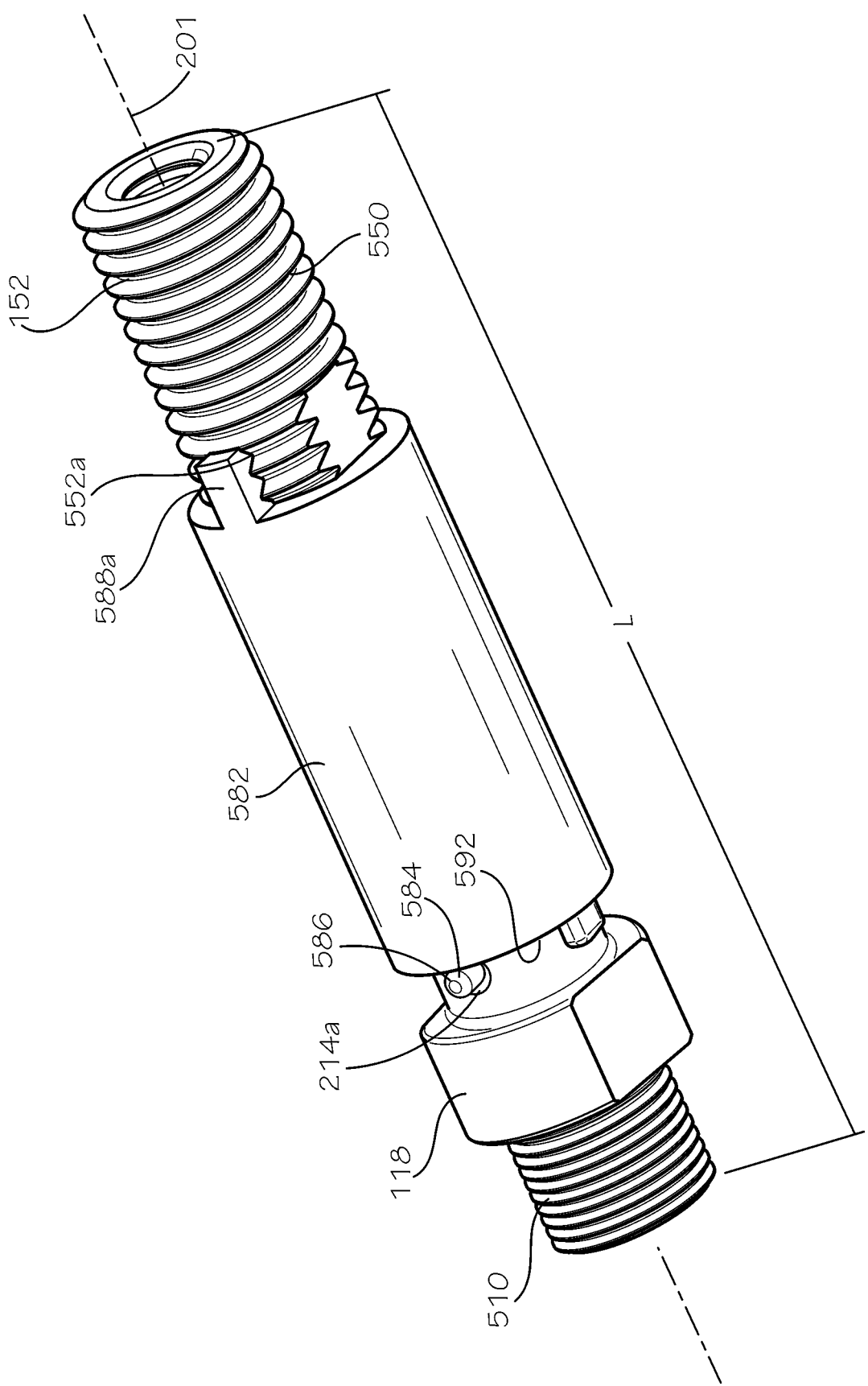
FIG. 10 is a perspective view of the tool holder of FIG. 5 demonstrating a third step in setting the tool holder length of the tool holder.

FIGS. 8-10 show the steps of adjusting the tool holder 500 to a length configuration for the tool holder length L (shown in FIG. 10) from a perspective view. As shown in FIG. 8, the sleeve retention device 584 can be removed or disengaged, depending upon the aspect. In the aspect shown, the plug 586 can be removed from the witness holes 214a,b,c,d (shown in FIG. 6). The locking sleeve 582 can then be axially slid along the main body 510 relative to the body axis 201 until the body end 592 of the locking sleeve contacts the mounting collar 118. This view demonstrates an initial contact position for the locking sleeve 582 when setting the tool holder 500 to a length configuration corresponding to witness hole 214a, as further described below. In the initial contact position associated with witness hole 214a, the locking sleeve 582 can cover witness hole 214a.

With the locking lugs 588a,b disengaged from the locking notches 552a,b (552b shown in FIG. 7), the locking mechanism 580 is in the unlocked position, wherein in this aspect, the locking mechanism 580 may only engage with the main body 510. In the unlocked position, the extension 550 can be free to rotate about the body axis 201 relative to the main body 510. The extension 550 can be rotated relative to the main body 510 to the position shown in FIG. 9 where the tool head 152 can make initial contact with the locking lugs 588a,b while the locking sleeve 582 is in the initial contact position. Depending on the rotational timing of the rod threading 166 (shown in FIG. 6) and the body threading 212 (shown in FIG. 6) relative to one another, the locking lugs 588a,b will either contact the tool head shoulder 352 or begin initial engagement with the locking notches 552a,b once the extension 550 is rotated as far inward as possible. Either condition can prevent further inward rotation of the extension 550 relative to the main body 510.

After initial contact between the locking lugs 588a,b and the tool head 152, then the locking lugs 588a,b and the locking notches 552a,b can be aligned, if they are not already aligned. If the timing of the rod threading 166 and body threading 212 caused the locking lugs 588a,b to initially engage the locking notches 552a,b, then the locking lugs 588a,b and the locking notches 552a,b are already aligned. If the locking lugs 588a,b contacted the tool head shoulder 352 rather than engaging the locking notches 552a,b, the extension 550 can be backed out a fraction of a rotation until the locking lugs 588a,b align with the locking notches 552a,b. Once the locking lugs 588a,b and locking notches 552a,b are aligned, the locking sleeve 582 can be axially translated from the initial contact position toward the tool head 152 until the locking lugs 588a,b are fully engaged with the locking notches 552a,b in the locked position, as shown in FIG. 10. Either locking lug 588a,b (588b shown in FIG. 7) can engage either locking notch 552a,b (552b shown in FIG. 7) in the present aspect. Axially translating the locking sleeve 582 towards the tool head 152 can reveal the witness hole 214a. With the witness hole 214a revealed, the sleeve retention device 584, for example, the plug 586 in this aspect, can be engaged with the witness hole 214a to secure the locking sleeve 582 in the locked position.

When setting the tool holder length L based on the witness hole 214a, the mounting collar 118 can provide a convenient physical stop for the initial contact position of the locking sleeve 582. When setting the tool holder length L based on the witness hole 214b (shown in FIG. 7) as shown by the configuration of FIG. 5, there may not be a physical stop for the body end 592 of the locking sleeve 582 to contact in the associated initial contact position for witness hole 214b. Instead, indicia may be provided on the main body 510, such as a circumferential line (not shown) positioned between the witness holes 214a,b, to identify the initial contact position. In such an aspect, the body end 592 of the locking sleeve 582 can be aligned with the indicia while the extension 550 is screwed inward until the tool head 152 makes initial contact with the locking lugs 588a,b (588b shown in FIG. 7). The locking notches 552a,b (552b shown in FIG. 7) can then be aligned with the locking lugs 588a,b per the procedure described above, and the locking sleeve 582 can be translated toward the tool head 152 to reveal witness hole 214b. The sleeve retention device 584 can then be engaged with the witness hole 214b to secure the locking sleeve 582 in the locked position.

In other aspects, the length of the rod 154 (shown in FIG. 6) can be designed to align the rod end 250 (shown in FIG. 6) with the witness holes 214a,b,c,d, when setting the tool holder length L to each of the different length configurations. In such aspects, the locking sleeve 582 can define witness holes (not shown) or a viewing port (not shown) to allow a user to see through the locking sleeve 582 when verifying that the rod end 250 is aligned with one of the witness holes 214a,b,c,d.

In aspects wherein the sleeve retention device 584 comprises a spring detent, a plurality of notches (not shown) may be defined by either or both of the main body 510 and the locking sleeve 582. These notches can correspond to the locking positions and the associated initial contact positions for each length configuration of the tool holder length L.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A tool holder comprising:
a main body defining a mounting end, a receiving end, and a body axis, the mounting end is positioned opposite from the receiving end, the main body comprises a main body bore that extends into the receiving end toward the mounting end;
an extension defining a tool head attached to a rod, the tool head defining a tool head end opposite from the rod, a tool holder length defined between the mounting end and the tool head end, the tool head is configured to receive at least one cutting tool, and the rod is received within the main body bore; and
a locking mechanism comprising a sleeve bore that fits over the main body, and a locking sleeve that is rotationally fixed about the body axis relative to the main body and axially moveable along the body axis relative to the main body; the locking mechanism engages the extension and the main body and extends the tool head beyond the receiving end of the main body in a locked position, the locking mechanism is disengaged from either the main body or the extension in an unlocked position, the locking mechanism is selectively positionable about and between the locked position and the unlocked position, the tool holder length is adjustable with the locking mechanism in the unlocked position, the tool holder length being fixed with the locking mechanism in the locked position.

2. The tool holder of claim 1, wherein:
the main body defines a guide rail extending axially relative to the body axis;
the locking sleeve defines a guide groove within the sleeve bore; and
the guide groove receives the guide rail.

3. The tool holder of claim 1, wherein the locking sleeve encloses the rod when the locking mechanism is positioned in the locked position.

4. The tool holder of claim 1, wherein:
the locking mechanism further comprises a sleeve retention device; and
the sleeve retention device resists axial motion of the locking sleeve along the body axis relative to the main body.

5. The tool holder of claim 1, wherein:
the tool head defines a locking notch;
the locking sleeve defines a locking lug;
the locking lug engages the locking notch in the locked position to rotationally fix the locking sleeve to the extension relative to the body axis; and
the locking lug is disengaged from the locking notch in the unlocked position.

6. The tool holder of claim 5, wherein:
at least a portion of the main body bore defines body threading;
at least a portion of the rod defines rod threading; and
the rod threadedly engages the main body bore.

7. A tool holder comprising:
a main body comprising:
a mounting end;
a receiving end positioned opposite the mounting end; and
a body axis extending through a main body bore of the main body;
an extension comprising a tool head attached to a rod, the tool head comprising:
a tool head end configured to receive a cutting tool opposite from the rod;
the rod received within the main body bore; and
a tool length defined between the mounting end and the tool head end; and
a locking mechanism adjustable between a locked position and an unlocked position, the locking mechanism comprising:
a locking sleeve that is axially moveable but rotationally fixed about the body axis; and
a sleeve bore that fits over the main body; wherein:
in the unlocked position:
the locking sleeve is disengaged from at least one of the main body or the extension; and
the tool length is adjustable; and
in the locked position:
the locking sleeve engages the extension and the main body;
the tool head of the extension extends along the body axis beyond the receiving end of the main body; and
the tool length is fixed.

8. The tool holder of claim 7, wherein:
the tool head defines tool head threading; and
the tool head threading is configured to mount a shell cutter.

9. The tool holder of claim 7, wherein the tool head defines a pair of parallel flats, and wherein the pair of parallel flats are configured to engage a wrench.

10. The tool holder of claim 7, wherein:
the tool head defines a pilot bore; and
the pilot bore is configured to receive a pilot drill or a shell cutter.

11. The tool holder of claim 7, wherein at least a portion of the main body bore defines body threading, and at least a portion of the rod defines rod threading.

12. The tool holder of claim 11, wherein the locking mechanism comprises a sleeve retention device that engages the locking sleeve.

13. The tool holder of claim 7, wherein:
the rod extends through the sleeve bore surrounding the main body and threadedly engages the main body;
the main body defines a witness hole extending from an outer surface to the main body bore; and
the tool length corresponds to a first configuration when the locking sleeve is aligned with the witness hole.

14. The tool holder of claim 13, wherein:
the main body defines a second witness hole extending from the outer surface to the main body bore;
the tool length corresponds to a second configuration when the locking sleeve is aligned with the second witness hole; and
the tool length in the first configuration is different from the tool length in the second configuration.

15. The tool holder of claim 14, wherein the tool length of the first configuration is greater than the tool length of the second configuration.

16. The tool holder of claim 7, wherein the locking sleeve comprises a locking lug, and the tool head comprises a locking notch.

17. The tool holder of claim 16, wherein the locking lug of the locking sleeve engages the locking notch in the tool head in the locked position.

18. The tool holder of claim 16, wherein the locking lug of the locking sleeve is disengaged from the locking notch in the tool head in the unlocked position.

19. The tool holder of claim 7, wherein the main body comprises one of a guide rail and a guide groove, and the locking sleeve comprises the other of the guide groove and the guide rail, wherein when the locking sleeve surrounds the main body, the guide rail and the guide groove facilitate movement along the body axis and prevent rotation of the locking sleeve relative to the main body.

20. The tool holder of claim 19, further comprising a plug to prevent movement of the locking mechanism along the body axis.

* * * * *